J. J. MULCONROY & E. S. MORRIS.
ARMORED HOSE.
APPLICATION FILED FEB. 11, 1911.
996,999.
Patented July 4, 1911.
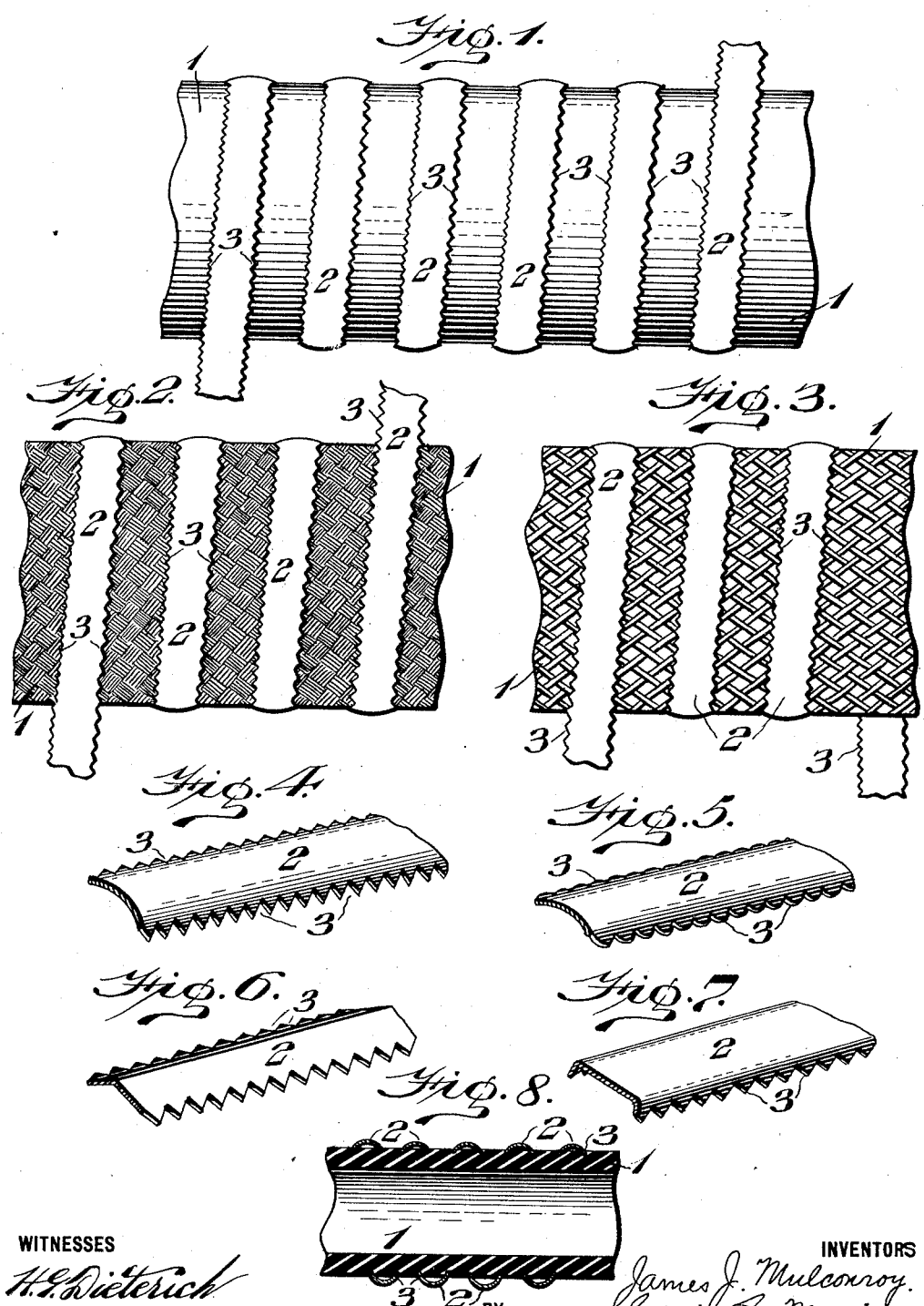

UNITED STATES PATENT OFFICE.

JAMES J. MULCONROY AND EDWIN S. MORRIS, OF PHILADELPHIA, PENNSYLVANIA.

ARMORED HOSE.

996,999. Specification of Letters Patent. Patented July 4, 1911.

Application filed February 11, 1911. Serial No. 608,114.

*To all whom it may concern:*

Be it known that we, JAMES J. MULCONROY and EDWIN S. MORRIS, citizens of the United States, residing in the city and county of Philadelphia, State of Pennsylvania, have invented certain new and useful Improvements in Armored Hose, of which the following is a full, clear, and exact description, reference being had to the accompanying drawings.

Armored hose is used very extensively for all the different uses to which hose is subjected, but most frequently when the hose is used for conveying steam, air, gas and water. The usual method heretofore employed in the manufacture of armor covering for hose or tubing of different kinds has consisted principally of spiral wire winding or an open mesh braided flat wire. There have been many objections to these styles of armor coverings because of the braided wire catching and breaking when pulled over rough obstructions or debris and because the spiral wire winding would catch and the spirals be displaced from their proper position when they will be crowded together at some places and at other places will be far apart, leaving long portions of the hose or tubing exposed and without armor protection. It has also been found in practice that the spiral wire often cuts into the wall of the hose or tubing, when pressure is internally applied, and weakens it.

We are aware that half round wire has been employed heretofore, such wire affording a wider base to form a contact with the hose, and that a projection or bead has been formed on the center of this base which cuts into the hose to prevent the wire from shifting on the hose or tubing, but the objection to this form is that the wire is very heavy and cumbersome and also expensive.

Our armor is designed to overcome these defects and in the drawings we have shown a construction for carrying out our invention, but it will be evident that various changes may be made which will come within the scope of our invention and we do not therefore desire to be limited in every instance to the exact construction as herein shown and described but desire to make such changes as may be necessary.

Figure 1 represents a side view of a piece of plain hose provided with our improved armor. Fig. 2 represents a side view of a piece of hose having a covering of braided fine wire and provided with our improved armor. Fig. 3 represents a side view of a piece of hose having a covering of braided flat wire and provided with our improved armor. Figs. 4, 5, 6 and 7 represent perspective views of short lengths of different forms of armor covering embodying our invention. Fig. 8 represents an axial section of a piece of plain hose provided with our improved armor.

Similar numerals of reference indicate corresponding parts in the figures.

Referring to the drawings:—The hose, 1, to which our improved armor is applied, may be plain and uncovered, as illustrated in Fig. 1 of the drawings, or it may be covered with canvas or other textile material, or it may be covered with braided wire,—fine or coarse, as desired,—as illustrated in Figs. 2 and 3. The armor consists of a strip, 2, of metal, which is concavo-convex in cross-section and is spirally wound around the hose. The edges, 3, of this strip are serrated, and the serrations may be pointed, like saw teeth, as illustrated clearly in Figs. 4, 6 and 7, or they may be rounded, like scallops, as illustrated in Fig. 5. If desired or required, the strip may be simply bent along its middle to have obtuse V-shape in cross-section, or it may be bent substantially rectangularly, as illustrated respectively in Figs. 6 and 7 of the drawings. Whatever cross-sectional shape the strip may have, the edges of the strip point inward to engage the surface of the hose. Whichever cross-sectional shape the strip may have, when it is spirally wrapped around a hose or tube, its serrated edges will engage the surface of the hose and will prevent displacement of the armor strip when the hose is dragged over obstructions or around the corners of objects. Owing to the fact that the strip is concavo-convex in cross-section, it is comparatively lighter than even half-round wire, thereby rendering hose covered with our armor considerably lighter than other armored hose.

The armor strip may be made from any suitable or desired metal, and may be manufactured and applied at no greater cost than ordinary wire.

Having thus described our invention, what we claim as new and desire to secure by Letters Patent, is:—

1. Armor for a hose, consisting of a metal strip, concavo-convex in cross section, having its longitudinal portions provided with serrated biting edges, the latter extending in diverging planes, whereby when the strip is wound upon a hose the said edges engage said hose at oblique biting angles.

2. Armor for a hose, consisting of a metal strip, concavo-convex in cross section, having its longitudinal portions provided with serrated biting edges, the latter extending in diverging planes, whereby when the strip is wound upon a hose the inner central surface of the strip is initially out of contact with the hose, and the said edges engage said hose at oblique biting angles.

JAMES J. MULCONROY.
EDWIN S. MORRIS.

Witnesses:
GEORGE J. HOLDEN,
F. F. MACKERELL.

Copies of this patent may be obtained for five cents each, by addressing the "Commissioner of Patents, Washington, D. C."